United States Patent
Jang et al.

(10) Patent No.: US 7,706,539 B2
(45) Date of Patent: Apr. 27, 2010

(54) METHOD OF GUARANTEEING USERS' ANONYMITY AND WIRELESS LOCAL AREA NETWORK (LAN) SYSTEM THEREFOR

(75) Inventors: Kyung-hun Jang, Suwon (KR); Jong-ae Park, Yongin (KR); In-sun Lee, Seoul (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 878 days.

(21) Appl. No.: 10/613,023

(22) Filed: Jul. 7, 2003

(65) Prior Publication Data

US 2004/0006642 A1    Jan. 8, 2004

(30) Foreign Application Priority Data

Jul. 6, 2002   (KR) ............... 10-2002-0039155

(51) Int. Cl.
H04K 1/00 (2006.01)

(52) U.S. Cl. ............... 380/270; 713/155; 380/247; 380/278; 380/277; 455/3.01; 455/463; 370/260; 709/227; 709/237

(58) Field of Classification Search ............... 713/155; 455/411, 3.01, 463; 709/245; 380/270, 278, 380/247; 370/260
See application file for complete search history.

(56) References Cited

U.S. PATENT DOCUMENTS

| | | | |
|---|---|---|---|
| 5,644,576 A * | 7/1997 | Bauchot et al. | 370/437 |
| 5,708,655 A * | 1/1998 | Toth et al. | 370/313 |
| 6,079,034 A * | 6/2000 | VanZante et al. | 714/48 |
| 6,240,513 B1 * | 5/2001 | Friedman et al. | 713/152 |
| 6,256,300 B1 | 7/2001 | Ahmed et al. | |
| 6,463,154 B1 * | 10/2002 | Patel | 380/270 |
| 6,570,857 B1 * | 5/2003 | Haartsen et al. | 370/312 |
| 6,580,704 B1 * | 6/2003 | Wellig et al. | 370/338 |
| 6,832,262 B2 * | 12/2004 | Cromer et al. | 709/245 |

(Continued)

FOREIGN PATENT DOCUMENTS

WO    WO 97/48246    12/1997

(Continued)

OTHER PUBLICATIONS

Orava et al. "Temorary MAC Address for Anonymity", Jul. 2002, IEEE 802.11-01/109r1.*

(Continued)

*Primary Examiner*—Ponnoreay Pich
*Assistant Examiner*—April Y Shan
(74) *Attorney, Agent, or Firm*—Lee & Morse, P.C.

(57) ABSTRACT

A method of guaranteeing users' anonymity and a wireless LAN system therefor are provided. In a wireless LAN system, the method of guaranteeing user' anonymity includes (a) creating a plurality of temporary address sets, each of which corresponds to a unique Media Access Control (MAC) address of a wireless terminal and transmitting the temporary address set to the corresponding wireless terminal, and (b) performing data packet transmission between the wireless terminal and the wireless access node using a temporary address selected from the temporary address set as a source address or a destination address. Therefore, it is possible to guarantee users' anonymity and improve security of a system by not exposing a MAC address during data packet transmission between a wireless terminal and a wireless access node.

19 Claims, 5 Drawing Sheets

U.S. PATENT DOCUMENTS

| | | | |
|---|---|---|---|
| 6,859,821 B1 * | 2/2005 | Ozzie et al. | 709/205 |
| 7,010,604 B1 * | 3/2006 | Munger et al. | 709/227 |
| 7,050,789 B2 * | 5/2006 | Kallio et al. | 455/411 |
| 7,188,180 B2 * | 3/2007 | Larson et al. | 709/227 |
| 7,192,235 B2 * | 3/2007 | Blight et al. | 455/412.1 |
| 2003/0177267 A1 * | 9/2003 | Orava et al. | 709/245 |

FOREIGN PATENT DOCUMENTS

| | | |
|---|---|---|
| WO | WO 99/37103 | 7/1999 |
| WO | WO 01/19053 A1 | 3/2001 |
| WO | WO 01/43466 A1 | 6/2001 |

OTHER PUBLICATIONS

Orava et al. "Temporary MAC Address for Anonymity", Mar. 14, 2002, IEEE 802.11-11-02-0261r0.*

Orava et al. "Temporary MAC Address for Anonymity", Jan. 2002, IEEE 802.11-02/109r0.*

Russ Housley "Alternate Temporary Key Hash", Apr. 23, 2002, IEEE 802.11-02/282r2.*

Orginazationally Unique Identifer definetion from Wikipedia, http://en.wikipedia.org/wiki/Organizationally_Unique_Identifer retrieved on Dec. 7, 2007.*

Gupta, et al, Parallel Architectures, Algorithms and Networks, IEEE Comput. Soc., pp. 228-234 (1996).

Title: "The design and deployment of a mobility supporting network".

* cited by examiner

METHOD OF GUARANTEEING USERS' ANONYMITY AND WIRELESS LOCAL AREA NETWORK (LAN) SYSTEM THEREFOR

BACKGROUND OF THE INVENTION

1. Field of the Invention

The present invention relates to wireless Local Area Network (LAN) system. More particularly, the present invention relates to a method of guaranteeing a user's anonymity and a wireless LAN system therefor, by using a temporary address generated from a unique Media Access Control (MAC) address as a source address or a destination address.

2. Description of the Related Art

Generally, a wireless LAN system consists of an ad-hoc network where a plurality of terminals, each of which includes a wireless Network Interface Card (NIC), are connected to each other and independently to wired LANs, and an infrastructure network where wireless terminals are connected to wired LANs through wireless access nodes. In an infrastructure network, a wireless cell Basic Service Set (BSS) is formed centering on one wireless access node. The wireless access node has the same functionality as a cellular phone station and connects all wireless terminals in the BSS to a LAN.

FIG. 1 illustrates a conceptual scheme showing the structure of a wireless LAN system of a general infrastructure network. A wireless LAN system as shown in FIG. 1 consists of a wireless access node 11 and four wireless terminals 13, 15, 17, and 19. The wireless access node 11 is connected to a wired network, such as very-high-speed Internet lines or private lines, and performs access arbitration between wireless terminals. The four wireless terminals 13, 15, 17, and 19 form a BSS and include wireless LAN cards respectively. The wireless LAN cards installed respectively in the first to fourth wireless terminals 13, 15, 17, and 19 have MAC addresses MAC Addr1 to MAC Addr4 corresponding to the first to fourth wireless terminals 13, 15, 17, and 19.

The unique MAC addresses MAC Addr1 to MAC Addr4 allocated to the respective wireless LAN cards of the first to fourth wireless terminals 13, 15, 17, and 19 are used as source addresses or destination addresses when sending and receiving data packets between the first through fourth wireless terminals 13, 15, 17, and 19 through the wireless access node 11. That is, to transmit a data packet (for example, a protocol data unit (PDU)) to one wireless terminal among the first to fourth wireless terminals 13, 15, 17, and 19, the wireless access node 11 sends transmission frames 12, 14, 16, and 18, each of which contain a unique MAC address (i.e., a MAC address among the first to fourth MAC addresses MAC Addr1 to MAC Addr4) of a wireless terminal representing the destination address. The address is placed in the header of the data packet (PDU) to be transmitted. On the other hand, each of the first to fourth wireless terminals 13, 15, 17, and 19 compares the MAC address corresponding thereto with the destination addresses contained in the headers of the transmission frames 12, 14, 16, and 18 sent from the wireless access node 11. If a destination address is identical to the MAC address corresponding to a wireless terminal, the corresponding wireless terminal accepts the frame. If no match is made, the frame is dropped over the network.

MAC addresses used for data communication between wireless terminals through wireless access nodes are unique values allocated upon manufacturing wireless LAN cards. The MAC address is not varied and also is not encoded. Accordingly, MAC addresses are exposed during data communication so that anonymity of a user using a corresponding MAC address cannot be guaranteed. Thus, a user using the corresponding MAC address may be easily tracked. That is, by merely monitoring unique MAC addresses, private user information about network access states, network access time, etc., may be outflowed, and more seriously, if any unique MAC address is exposed, a greater risk exists for malicious users eavesdropping at the link layer. Further, the possibility of an attack on the encryption channels is increased in long-running monitoring.

As described above, since it is necessary to guarantee a user's anonymity so that information about a user of a wireless LAN system is not leaked to objects other than a permitted entity, the conventional wireless LAN system of the infrastructure network has many security problems.

SUMMARY OF THE INVENTION

The present invention provides a method for guaranteeing a user's anonymity in a wireless Local Area Network (LAN) system by using a temporary address randomly selected from a temporary address set that contains mapping to a Media Access Control (MAC) address as the source address or the destination address upon transmitting data packets between a wireless access node and wireless terminals.

The present invention further provides a wireless LAN system for guaranteeing a user's anonymity by using a temporary address generated from a unique MAC address.

According to a feature of an embodiment of the present invention, there is provided a method of guaranteeing users' anonymity in a wireless LAN system, the method including: (a) creating a plurality of temporary address sets, each of which corresponds to a unique Media Access Control (MAC) address of a wireless terminal, and transmitting each temporary address set to the corresponding wireless terminal, and (b) performing data packet transmissions between a wireless terminal and a wireless access node using a temporary address selected from the temporary address set corresponding to the wireless terminal as a source address or a destination address.

In the method above, the wireless access node may create the temporary address sets, each of which preferably consists of N (where N is an integer greater than or equal to two) temporary addresses using a MAC address contained in an access or authentication request message transmitted from a corresponding wireless terminal.

In the method above, in (a), the wireless access node may encode the temporary address sets using a predetermined encryption key for each temporary address set, and may respectively transmit the encoded temporary address sets to the corresponding wireless terminals. Each encryption key may be created upon authentication of the corresponding wireless terminal.

In the method above, (b) may further include (b1) a first addressing, which is performed in the wireless access node, and generates a temporary address as a destination address randomly selected from the temporary address set corresponding to a wireless terminal that is requesting authentication. Also, (b) may include (b2) a second addressing, which is performed in the wireless terminal, and generates a temporary address as a source address randomly selected from the temporary address set corresponding to the wireless terminal.

According to another feature of an embodiment of the present invention, there is provided a computer readable medium having embodied thereon a computer program for the method described above.

According to another feature of an embodiment of the present invention, there is provided a wireless Local Area Network (LAN) system of guaranteeing users' anonymity including a wireless access node, which creates a plurality of temporary address sets, each of which corresponds to a unique Media Access Control (MAC) address of a wireless terminal, and uses a temporary address selected from each temporary address set as a destination address, and at least one wireless terminal, which receives a temporary address set corresponding to a unique MAC address thereof from among the plurality of temporary address sets created in the wireless access node, and uses a temporary address selected from the received temporary address set as a source address.

In the system above, the wireless access node may create the temporary address sets, each of which consists of N (where N is an integer greater than or equal to two) temporary addresses, preferably using for each address set the MAC address contained in an access or authentication request message transmitted from the corresponding wireless terminal.

In the system above, the wireless access node preferably encodes the temporary address sets using a predetermined encryption key for each address set, and respectively transmits the encoded temporary address sets to the corresponding wireless terminals. Preferably, each encryption key is created upon authentication of the corresponding wireless terminal.

In the system above, the wireless access node may include a first memory, which stores the plurality of temporary address sets, each of which consists of N (where N is an integer greater than or equal to two) random addresses and is created corresponding to a unique MAC address, a first MAC address filter, which filters a unique MAC address from a source address of a data packet received from a corresponding wireless terminal by referring to the temporary address sets stored in the first memory, a destination address generation unit, which enables a temporary address set corresponding to the unique MAC address of the wireless terminal requesting authentication from among the temporary address sets stored in the first memory, generates a first random selection signal, generates a temporary address randomly selected from the enabled temporary address set, and uses the temporary address as a destination address, and a first random selection unit which randomly selects a temporary address from the temporary address set enabled in the first memory according to the first random selection signal generated in the destination address generation unit, and outputs the selected temporary address to the destination address generation unit.

The wireless terminal may include a second memory which receives a temporary address set from the wireless access node and stores the temporary address set corresponding to a unique MAC address of the wireless terminal, a second MAC address filter which determines whether a destination address of a data packet received from the wireless access node is included in the temporary address set by referring to the temporary address set stored in the second memory, and generates a receipt enable signal according to a determination result, a source address generation unit, which generates a second random selection signal according to a source address request signal, generates a temporary address randomly selected from the temporary address set stored in the second memory, and uses the temporary address as a source address, and a second random selection unit which randomly selects a temporary address from the temporary address set stored in the second memory according to the second random selection signal generated in the source address generation unit, and outputs the selected temporary address to the source address generation unit.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Korean Patent Application No. 2002-39155, filed on Jul. 6, 2002, and entitled: "Method of Guaranteeing Users' Anonymity and Wireless Local Area Network (LAN) System Therefor," is incorporated by reference herein in its entirety.

Figure 2:
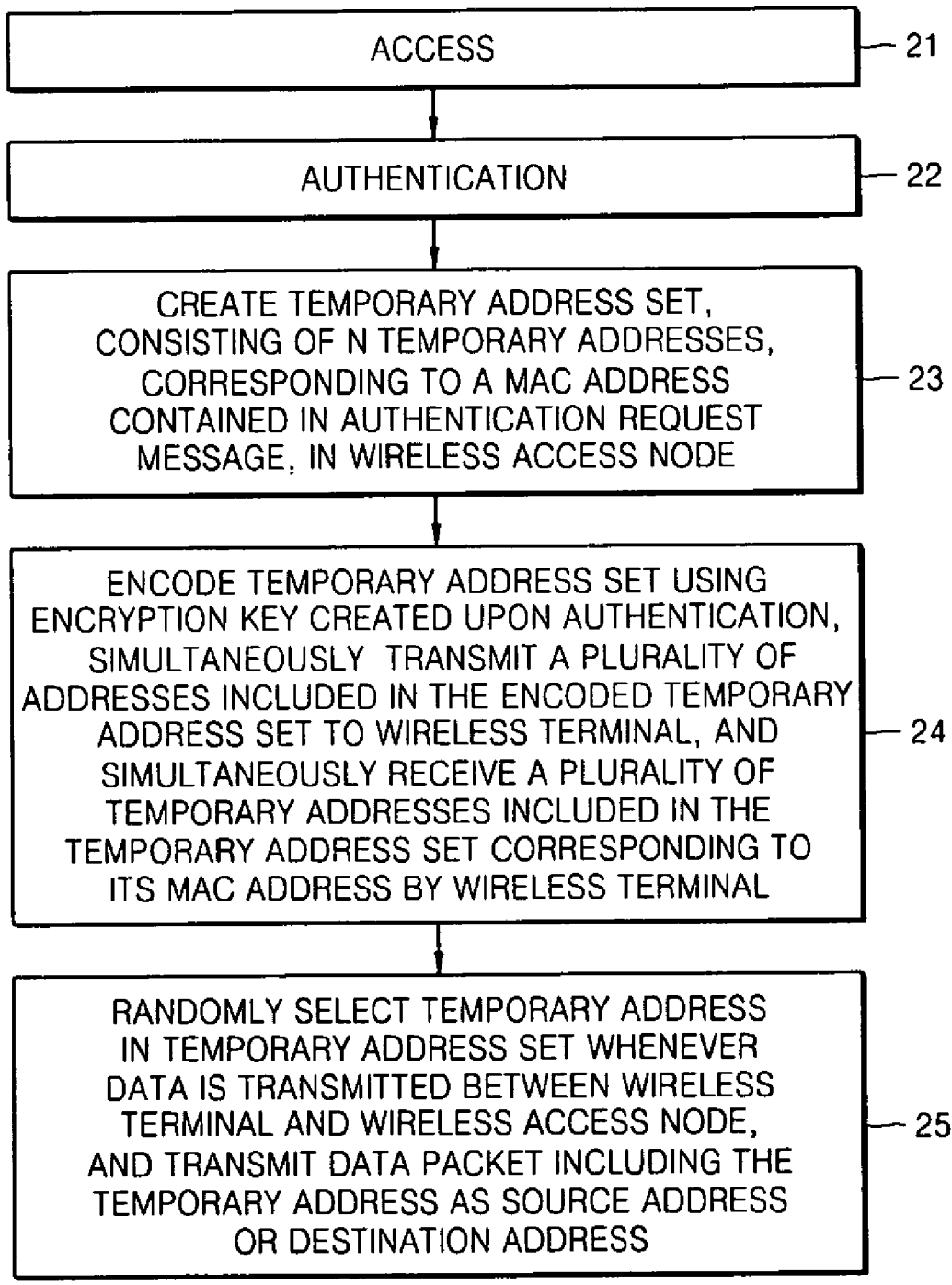
FIG. 2 is a flow chart for describing a method of guaranteeing users' anonymity in a wireless LAN system according to a preferred embodiment of the present invention.
Figure 3:
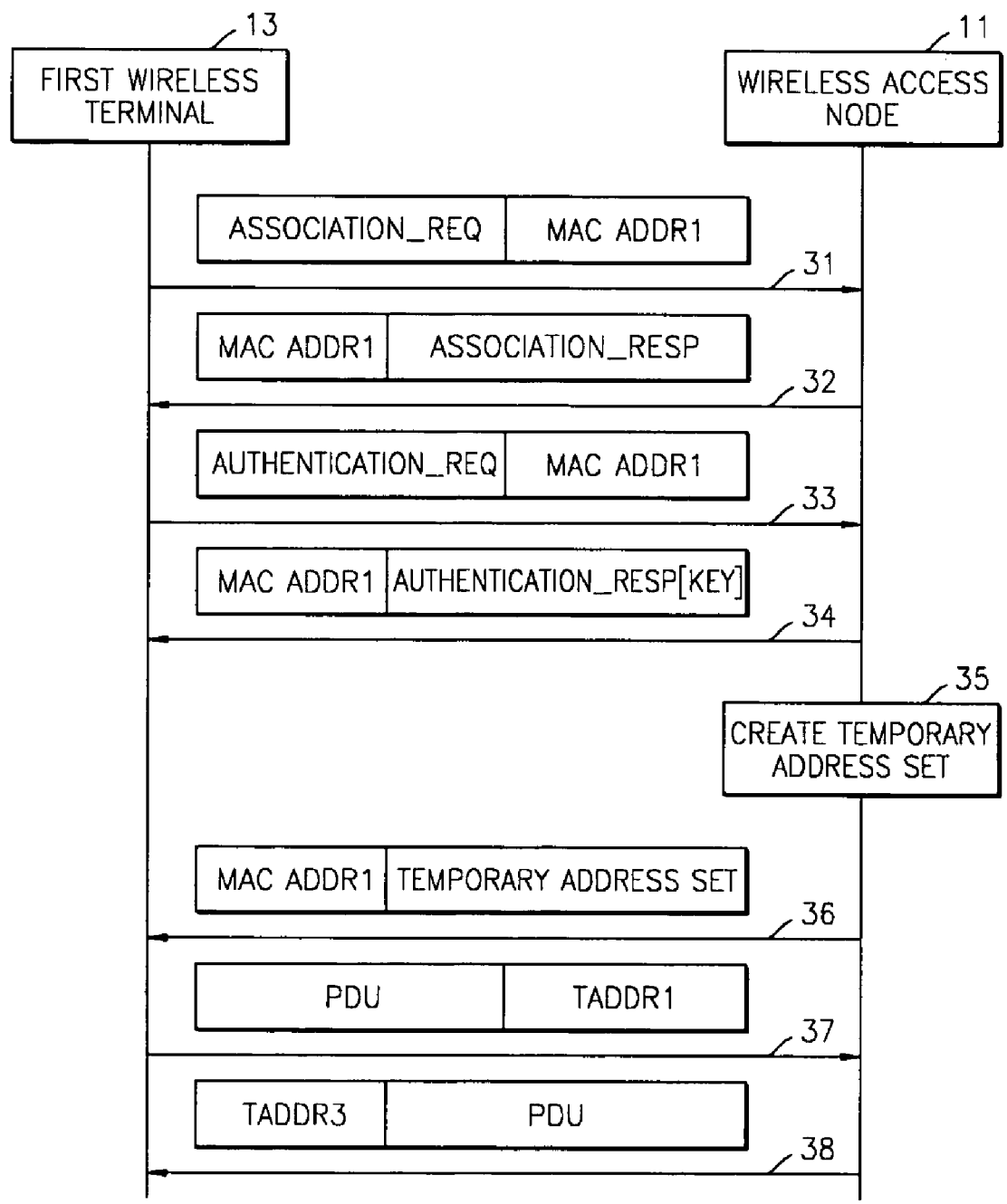
FIG. 3 illustrates a view for describing an operation relationship between a wireless access node and wireless terminals.

FIG. 2 is a flow chart for describing a method of guaranteeing users' anonymity in a wireless LAN system according to an embodiment of the present invention. The method of guaranteeing users' anonymity includes access step 21, authentication step 22, temporary address set generation step 23, temporary address set transmission step 24, and data packet transmission step 25. FIG. 3 illustrates a view for describing the operation relationship between a wireless access node and wireless terminals. Signal transmissions between a wireless access node and a wireless terminal in the above-mentioned steps are illustrated in FIG. 3.

Figure 1:
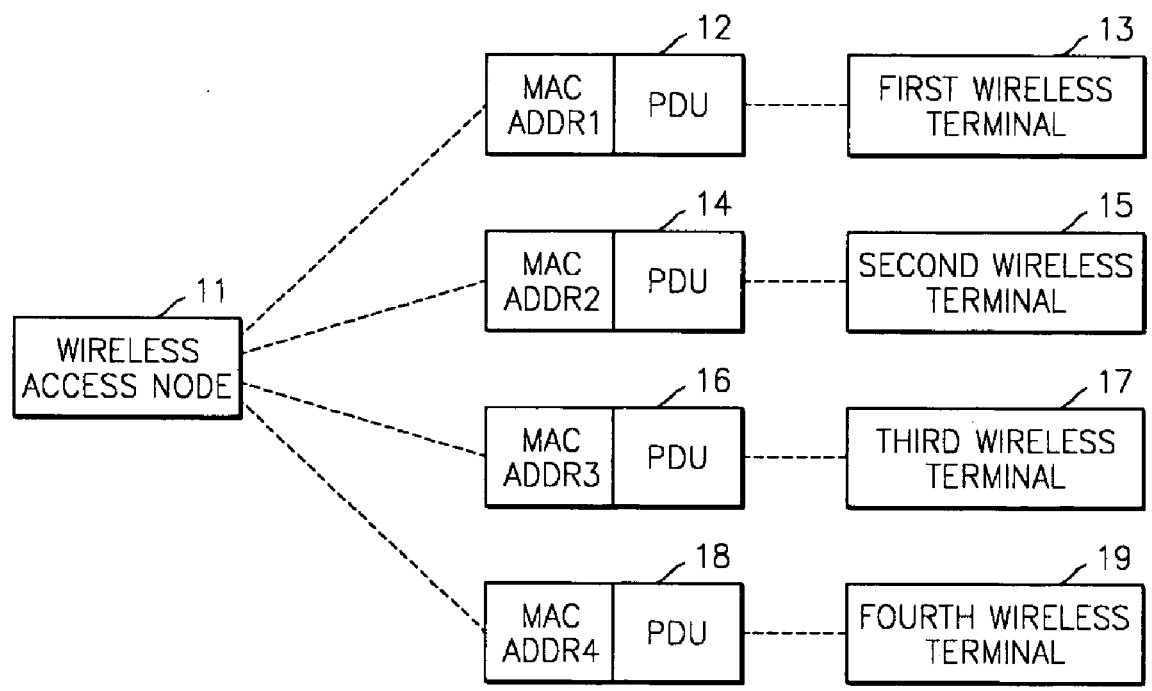
FIG. 1 illustrates a conceptual scheme showing the structure of a general wireless Local Area Network (LAN) system.

Now, the steps shown in FIG. 2 will be described in connection with FIGS. 1 and 3.

In the access step 21, if a first wireless terminal 13 requests access, access between the first wireless terminal 13 and a wireless access node 11 is performed. For performing this access, the first wireless terminal 13 transmits to the wireless access node 11 an access request message Association_Req containing its own unique MAC address MAC Addr1 as the source address (process 31 of FIG. 3). The wireless access node 11, which receives the access request message Association_Req, tries to access the first wireless terminal 13. If this access succeeds, the wireless access node 11 transmits to the first wireless terminal 13 an access success message Association_Resp containing the unique MAC address MAC Addr1 of the first wireless terminal 13 as the destination address (process 32 of FIG. 3).

In the authentication step 22, if a first wireless terminal 13 requests authentication, the wireless access node 11 performs authentication of the first wireless terminal 13. For performing this authentication, the first wireless terminal 13 transmits to the wireless access node 11 an authentication request message Authentication_Req containing its own unique MAC address MAC Addr1 as the source address (process 33 of FIG. 3). The wireless access node 11, which receives the authentication request message Authentication_Req, performs an authentication of the first wireless terminal 13. If the authentication succeeds, the wireless access node 11 creates an encryption key. At this time, the wireless access node 11 transmits to the first wireless terminal 13 the encryption key in the authentication success message Authentication_Resp containing the unique MAC address MAC Addr1 of the first wireless terminal 13 as the destination address (process 34 of FIG. 3).

In the temporary address set generation step 23, the wireless access node 11 randomly transforms the unique MAC address MAC Addr1 of the first wireless terminal 13 contained in the authentication request message Authentication_Req, and creates a temporary address set consisting of N temporary addresses corresponding to the unique MAC address, wherein N is preferably an integer greater than or equal to two (process 35 of FIG. 3).

In the temporary address set transmission step 24, the temporary address set created in the wireless access node 11 is encoded using the encryption key created in the authentication step 22, and then is transmitted to the first wireless terminal 13 using the unique MAC address MAC Addr1 of the first wireless terminal 13 as the destination address (process 36 of FIG. 3).

In the data packet transmission step 25, whenever data communication is performed between a first wireless terminal 13 and wireless access node 11, a temporary address is randomly selected from a temporary address set and assigned to the data packet as a source address or destination address. That is, when the first wireless terminal 13, which receives an authentication success message Authentication_Resp and a temporary address set from the wireless access node 11, tries to transmit a data packet PDU to the wireless access node 11, the first wireless terminal 13 addresses as the source address a temporary address, i.e., a first temporary address Taddr1, randomly selected from the N temporary addresses in the temporary address set and transmits the data packet PDU (process 37 of FIG. 3). On the other hand, when a data packet PDU is transmitted from the wireless access node 11 to the first wireless terminal 13, a temporary address, i.e., a third temporary address Taddr3, randomly selected from the N temporary addresses in the temporary address set, is set as the destination address and the data packet PDU is transmitted (process 38 of FIG. 3).

Figure 4:
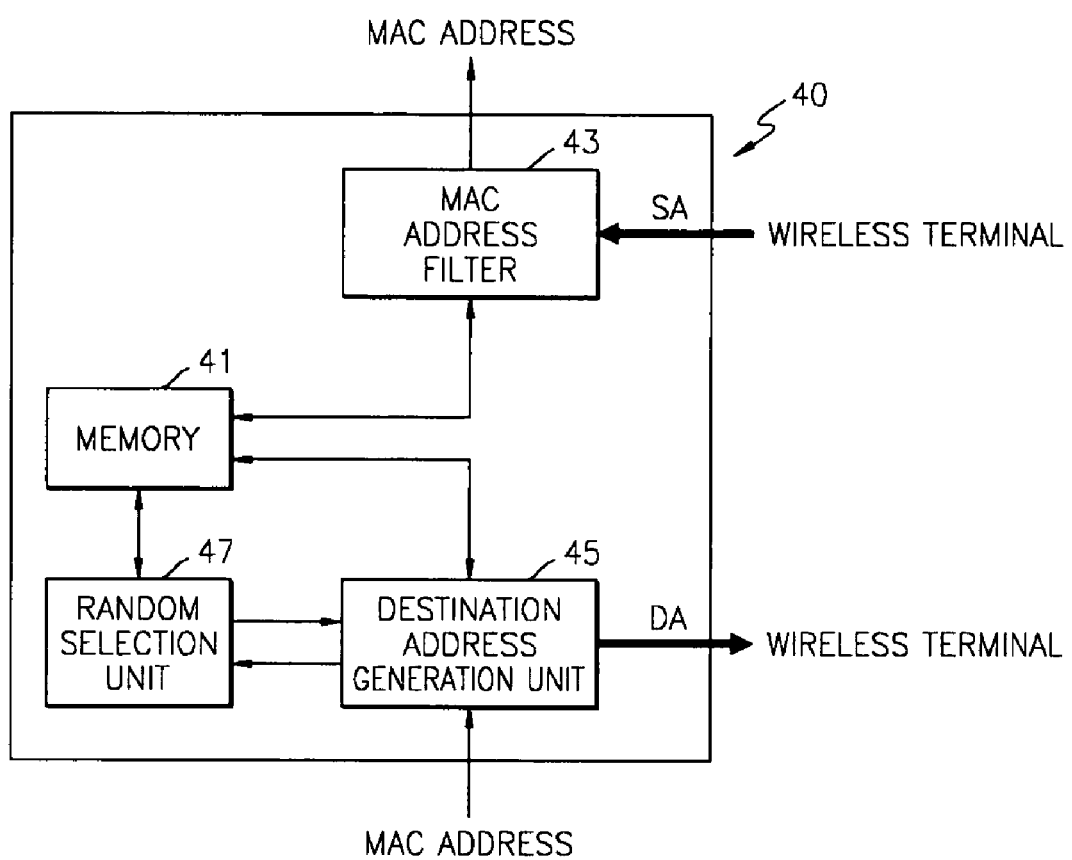
FIG. 4 is a block diagram showing a detailed structure of an addressing unit of the wireless access node in the wireless LAN system according to a preferred embodiment of the present invention.

FIG. 4 is a block diagram showing a detailed structure of an addressing unit 40 of the wireless access node 11 in the wireless LAN system of the present invention. The addressing unit 40 includes a memory 41, a MAC address filter 43, a destination address generation unit 45, and a random selection unit 47, for addressing the destination addresses used in the data packet transmission step (step 25) described with reference to FIG. 3.

Referring to FIG. 4 in addition to FIGS. 1-3, operations of the addressing unit 40 will now be described. After a wireless access node 11 completes authentication of a first wireless terminal 13, a temporary address set which consists of N temporary addresses randomly created corresponding to a unique MAC address of the first wireless terminal 13, are stored in memory 41. At this time, a temporary address set is created corresponding to a unique MAC address for each wireless terminal requesting authentication and the temporary address sets are stored in the form of a look up table in memory 41.

A MAC address filter 43 works together with memory 41 when a data packet is transmitted from the first wireless terminal 13 to the wireless access node 11. The destination address generation unit 45 and the random selection unit 47 work together with memory 41 when a data packet is transmitted from the wireless access node 11 to the first wireless terminal 13. Operations of these components will be described in detail as follows.

The MAC address filter 43 receives a source address (SA) extracted from the data packet transmitted from the first wireless terminal 13, and attempts to discover a temporary address set including a temporary address matching the source address by referring to the plurality of temporary address sets stored in memory 41. If the temporary address set is found, a unique MAC address corresponding to the temporary address set is extracted and transmitted to any layers requiring it.

The destination address generation unit 45 receives the unique MAC address of the first wireless terminal 13 obtained in the access/authentication steps, finds a temporary address set corresponding to the received unique MAC address among the plurality of temporary address sets stored in memory 41, activates the found temporary address set, and then outputs a random selection signal to a random selection unit 47.

The random selection unit 47 randomly selects a temporary address from the temporary address set activated in memory 41, depending on the random selection signal, and outputs the selected temporary address to the destination address generation unit 45. The destination address generation unit 45 sets the temporary address received from the random selection unit 47 as the destination address (DA), and outputs the destination address (DA).

That is, whenever data packets are transmitted from the wireless access node 11 to the first wireless terminal 13, each data packet has a different destination address from the others. This applies equally to other wireless terminals in a BSS (Basic Service Set).

Figure 5:
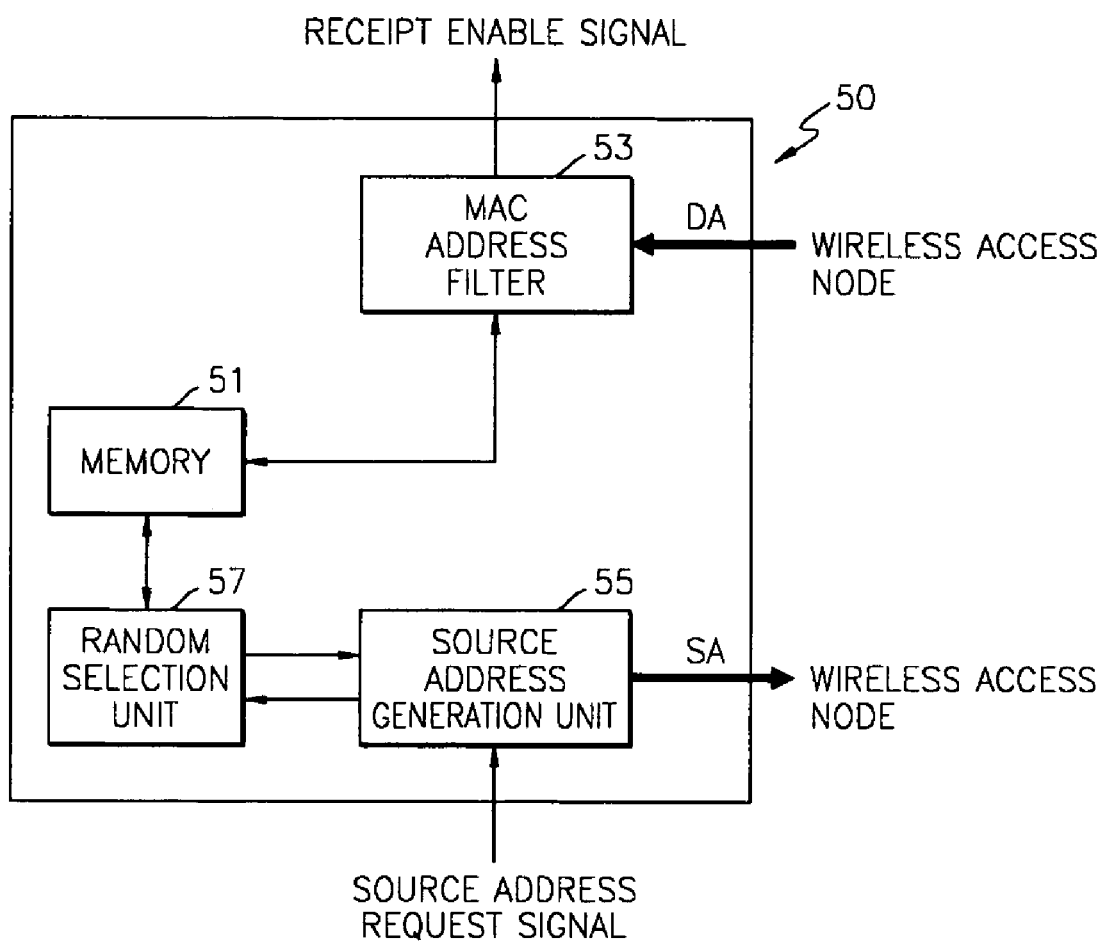
FIG. 5 is a block diagram showing a detailed structure of an addressing unit of the wireless terminal in the wireless LAN system according to a preferred embodiment of the present invention.

FIG. 5 illustrates a block diagram showing a detailed structure of an addressing unit 50 of the first wireless terminal 13 in the wireless LAN system according to the present invention. The addressing unit 50 includes a memory 51, a MAC address filter 53, a source address generation unit 55, and a random selection unit 57, for addressing the source addresses used in the data packet transmission step 25 described with reference to FIG. 3.

Referring to FIG. 5 in addition to FIGS. 1-3, operations of the addressing unit 50 will now be described. Temporary address sets transmitted from the wireless access node 11 are stored in the memory 51. Only one temporary address set corresponding to a unique MAC address of the first wireless terminal 13 is stored in the memory 51.

The MAC address filter 53 works together with the memory 51 when a data packet is transmitted from the wireless access node 11 to the first wireless terminal 13. The source address generation unit 55 and the random selection unit 57 work together with memory 51 when a data packet is transmitted from the first wireless terminal 13 to the wireless access node 11. Operations of these components will be described in detail as follows.

The MAC address filter 53 receives a destination address (DA) extracted from the data packet transmitted from the wireless access node 11, determines whether a temporary address allocated to the destination address (DA) is included in the temporary address set stored in memory 51, and outputs a receipt enable signal indicating receipt of the data packet, according to the determination result. That is, the first wireless terminal 13 receives the data packet sent from the wireless access node 11 when a temporary address allocated to the destination address (DA) is included in the temporary address set stored in memory 51.

The source address generation unit 55 outputs a random selection signal to the random selection unit 57 when receiving a source address request signal, in order to transmit a data packet from the first wireless terminal 13 to the wireless access node 11. The random selection unit 57 randomly selects a temporary address from the temporary address set stored in memory 51, according to the random selection signal, and outputs the selected temporary address to the source address generation unit 55. The source address generation unit 55 sets the temporary address provided from the random selection unit 57 as the source address (SA), and outputs the source address (SA) to the wireless access node 11.

That is, whenever data packets are transmitted from the first wireless terminal 13 to the wireless access node 11, each data packet has a different source address from the others. This applies equally to all other wireless terminals in a BSS.

The above-described preferred embodiments may be embodied as computer programs and may also be embodied on a general-purpose digital computer for executing the computer programs using a computer readable medium. The computer readable medium may include storage media, such as magnetic storage media (e.g. ROMs, floppy discs, hard discs, etc.), and optically readable media (e.g. CD-ROMs, DVDs, etc.).

As described above, according to the present invention, it is possible to prevent a MAC address from being exposed during data communication, thereby guaranteeing a user's anonymity, by using a temporary address selected from a temporary address set that contains mappings to a unique MAC address. The temporary address is used as a source address or a destination address upon data communication between a wireless access node and a wireless terminal.

Also, by using a temporary address randomly selected from a temporary address set, it is possible to prevent the outflow of private information and reduce the risk of attack by malicious users. The temporary address is used as the source address or destination address upon data communication between a wireless access node and a wireless terminal, so that whenever a data packet is transmitted, a different source address or a different destination address is used.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of guaranteeing users' anonymity in a wireless Local Area Network (LAN) system, the method comprising:
   (a) creating a temporary address set by randomly transforming a unique Media Access Control (MAC) address of a wireless terminal, and simultaneously transmitting more than one addresses included in the temporary address set to the wireless terminal; and
   (b) performing data packet transmissions between the wireless terminal and a wireless access node using a temporary address selected from the temporary address set corresponding to the wireless terminal as a source address or a destination address, wherein in (a), the wireless access node encodes the temporary address set using a predetermined encryption key for the temporary address set, and transmits the encoded temporary address set to the wireless terminal.

2. The method as claimed in claim 1, wherein in (a), the wireless access node creates the temporary address set, which consists of N (where N is an integer greater than or equal to two) temporary addresses using a MAC address contained in an access or authentication request message transmitted from the wireless terminal.

3. The method as claimed in claim 1, wherein each encryption key is created upon authentication of the wireless terminal.

4. The method as claimed in claim 1, wherein (b) further comprises: (b1) a first addressing, which is performed in the wireless access node, and generates a destination address by randomly selecting, as the destination address, one of the more than one temporary addresses from the temporary address set of the wireless terminal after the wireless terminal has requested authentication.

5. The method as claimed in claim 4, wherein (b) further comprises:
   (b2) a second addressing, which is performed in the wireless terminal, and generates a source address by randomly selecting, as the source address, one of the more than one temporary addresses from the temporary address set of the wireless terminal.

6. A computer readable medium having embodied thereon a computer program for the method claimed in claim 1.

7. A computer readable medium having embodied thereon a computer program for the method claimed in claim 2.

8. A computer readable medium having embodied thereon a computer program for the method claimed in claim 5.

9. A wireless Local Area Network (LAN) system of guaranteeing users' anonymity comprising:
   at least one wireless terminal; and
   a wireless access node adapted to create a temporary address set by randomly transforming a unique Media Access Control (MAC) address of wireless terminal, and use a temporary address selected from the temporary address set as a destination address, wherein the wireless terminal is adapted to simultaneously receive more than one temporary addresses included in the temporary address set corresponding to the unique MAC address thereof, and use a temporary address selected from the received temporary address set as a source address, wherein the wireless access node encodes the temporary address set using a predetermined encryption key for the address set, and respectively transmits the encoded temporary address set to the wireless terminal.

10. The system as claimed in claim 9, wherein the wireless access node creates the temporary address set, which consists of N (where N is an integer greater than or equal to two) temporary addresses using the MAC address contained in an access or authentication request message transmitted from the wireless terminal.

11. The system as claimed in claim 9, wherein the encryption key is created upon authentication of the wireless terminal.

12. The system as claimed in claim 9, wherein the wireless LAN system includes more than one wireless terminals each having a respective unique MAC address and the wireless access node is adapted to create a respective temporary address set for each of the more than one wireless terminals, each of the temporary address sets being created by randomly transforming the respective unique MAC address of the corresponding wireless terminal, and the wireless access node comprises:
   a first memory adapted to store the temporary address sets, each of which consists of N (where N is an integer greater than or equal to two) random addresses;
   a first MAC address filter adapted to filter one of the respective unique MAC addresses from a source address of a data packet received from one of the wireless terminals by referring to the temporary address sets stored in the first memory;

a destination address generation unit adapted to enable a respective one of the temporary address sets corresponding to the filtered unique MAC address of the wireless terminal having requested authentication from among the temporary address sets stored in the first memory, and generate a first random selection signal; and a first random selection unit adapted to receive the first random selection signal from the destination address generation unit, randomly select one of the random addresses from the temporary address set enabled in the first memory according to the first random selection signal generated in the destination address generation unit, and output the selected random address to the destination address generation unit, wherein the destination address generation unit uses the selected random address as a respective destination address.

13. The system as claimed in claim 12, wherein at least one of the more than one wireless terminals comprises:

a second memory adapted to receive and store the respective one of the temporary address sets corresponding to the unique MAC address thereof from the wireless access node;

a second MAC address filter adapted to determine whether a destination address of a data packet received from the wireless access node is included in the respective one of the temporary address sets that is stored in the second memory, and generate a receipt enable signal according to a determination result;

a source address generation unit adapted to generate a second random selection signal according to a source address request signal; and a second random selection unit adapted to randomly select one of the random addresses from the respective one of the temporary address sets stored in the second memory according to the second random selection signal generated in the source address generation unit, and output the selected random address to the source address generation unit, wherein the source address generation unit uses the selected random address as a respective source address.

14. A wireless access node of guaranteeing users' anonymity comprising:

a memory adapted to receive and store more than one temporary address sets, each of which consists of N (where N is an integer greater than or equal to two) random addresses and is created by randomly transforming a unique MAC address of a wireless terminal; and a destination address generation unit adapted to enable a temporary address set corresponding to the unique MAC address of the wireless terminal requesting authentication from among the temporary address sets stored in the memory, generate a temporary address randomly selected from the enabled temporary address set, and use the temporary address as a destination address, wherein the temporary address set is encoded using a predetermined encryption key for the temporary address set, and more than one temporary addresses included in the encoded temporary address set is simultaneously transmitted to the wireless terminal.

15. The wireless access node claimed in claim 14 further comprising:

an MAC address filter adapted to filter the unique MAC address from a source address of a data packet received from a corresponding wireless terminal by referring to the temporary address sets stored in the memory.

16. The wireless access node claimed in claim 15 further comprising:

a random selection unit adapted to randomly select a temporary address from the temporary address set enabled in the memory according to a random selection signal, and output the selected temporary address to the destination address generation unit.

17. A wireless terminal of guaranteeing users' anonymity comprising:

a memory adapted to receive and store a temporary address set including more than one temporary addresses simultaneously transmitted to the wireless terminal, created by randomly transforming a unique MAC address of the wireless terminal and encoded using a predetermined encryption key for the temporary address set, from a wireless access node, and store the temporary address set; and a source address generation unit adapted to generate a temporary address randomly selected from the temporary address set stored in the memory, and use the temporary address as a source address.

18. The wireless terminal claimed in claim 17 further comprising:

an MAC address filter adapted to determine whether a destination address of a data packet received from the wireless access node is included in the temporary address set by referring to the temporary address set stored in the memory, and generate a receipt enable signal according to a determination result.

19. The wireless terminal claimed in claim 18 further comprising:

a random selection unit adapted to randomly select one of the more than one temporary addresses from the temporary address set stored in the memory according to a random selection signal generated from a source address request signal, and output the selected temporary address to the source address generation unit.

* * * * *